United States Patent
Kumar et al.

(10) Patent No.: US 11,921,792 B2
(45) Date of Patent: Mar. 5, 2024

(54) METHOD AND APPARATUS FOR CURATION OF CONTENT

(71) Applicant: Rovi Guides, Inc., San Jose, CA (US)

(72) Inventors: Vijay Kumar, Karnataka (IN); Rajendran Pichaimurthy, Bangalore (IN); Madhusudhan Srinivasan, Bangalore (IN); Gyanveer Singh, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/520,199

(22) Filed: Jul. 23, 2019

(65) Prior Publication Data

US 2021/0026902 A1    Jan. 28, 2021

(51) Int. Cl.
| | | |
|---|---|---|
| G06F 17/00 | (2019.01) | |
| G06F 7/00 | (2006.01) | |
| G06F 16/903 | (2019.01) | |
| G06F 16/9032 | (2019.01) | |
| G06F 16/9038 | (2019.01) | |

(52) U.S. Cl.
CPC .. *G06F 16/90348* (2019.01); *G06F 16/90328* (2019.01); *G06F 16/90332* (2019.01); *G06F 16/9038* (2019.01)

(58) Field of Classification Search
CPC ........... G06F 16/90348; G06F 16/9038; G06F 16/90332; G06F 16/90328; G06F 16/9538
USPC ....................................................... 707/723
See application file for complete search history.

(56) References Cited

U.S. PATENT DOCUMENTS

| | | | |
|---|---|---|---|
| 7,774,294 B2 * | 8/2010 | Aravamudan | G06Q 30/0205 706/62 |
| 9,443,245 B2 * | 9/2016 | Sun | G06F 40/30 |
| 11,003,669 B1 * | 5/2021 | Nelson | G06F 3/017 |
| 2002/0065739 A1 * | 5/2002 | Florance | G06Q 30/06 705/26.43 |
| 2002/0154155 A1 * | 10/2002 | McKirchy | G09B 7/02 715/705 |
| 2005/0028194 A1 * | 2/2005 | Elenbaas | G06F 16/7834 725/132 |
| 2007/0028171 A1 * | 2/2007 | MacLaurin | G06F 16/164 715/825 |
| 2008/0168045 A1 * | 7/2008 | Suponau | G06F 16/9038 |
| 2011/0040657 A1 * | 2/2011 | Roswell | G06F 16/958 707/E17.046 |
| 2011/0191332 A1 * | 8/2011 | Barve | G06F 16/9535 707/723 |
| 2012/0005209 A1 * | 1/2012 | Rinearson | G06F 16/285 707/754 |
| 2013/0013650 A1 * | 1/2013 | Shum | G06F 16/24573 707/805 |
| 2014/0186817 A1 * | 7/2014 | Wang | G09B 7/00 434/362 |

(Continued)

*Primary Examiner* — Pavan Mamillapalli
(74) *Attorney, Agent, or Firm* — Haley Guiliano LLP (57) ABSTRACT

Systems and methods for curation of content, such as e-learning content or online instructional materials, according to particular criteria such as the amount of pictorial representations contained therein, the amount of verbal expression contained therein, and whether the content contains a summary. Other criteria may also be employed. Users may select any one or more of these and other criteria. Content is then sorted according to the selected criteria and presented as an ordered list of content that users can select for viewing.

20 Claims, 9 Drawing Sheets

(56) References Cited

U.S. PATENT DOCUMENTS

| | | | |
|---|---|---|---|
| 2014/0289779 A1* | 9/2014 | Ren | H04N 21/4668 |
| | | | 725/53 |
| 2016/0260064 A1* | 9/2016 | Ahmed | H04L 67/306 |
| 2016/0378867 A1* | 12/2016 | Panuganty | G06F 16/951 |
| | | | 707/710 |
| 2017/0052948 A1* | 2/2017 | Stanton | G06F 16/334 |
| 2019/0278776 A1* | 9/2019 | Villafane | G06F 16/9535 |

\* cited by examiner

FIG. 5A    To FIG. 5B, Step 520

FIG. 5B

| Book Chapter | Pictorial Representations, Diagram, Flowcharts, Depictions or Illustrations | Verbose | Positive Review Score | Negative Review Score | Reference to Job Market (keywords match from job descriptions (JDs) on LinkedIn or jobsites) | Primary Subject | Chapter Name | Chapter Score | Highest Chapter Score | |
|---|---|---|---|---|---|---|---|---|---|---|
| Book1-Chapter1 | 10 | 3 | 10 | 1 | 10 | Advanced Machine Learning | Statistics | 32 | Highest Chapter 1 score | Chapter 1 |
| Book2-Chapter1 | 9 | 3 | 9 | 2 | 9 | Advanced Machine Learning | Statistics | 31 | NA | |
| Book3-Chapter1 | 8 | 3 | 8 | 3 | 8 | Advanced Machine Learning | Statistics | 30 | NA | |
| Book1-Chapter2 | 10 | 3 | 10 | 1 | 10 | Advanced Machine Learning | Linear Regression | 32 | Highest Chapter 2 score | Chapter 2 |
| Book2-Chapter2 | 9 | 3 | 9 | 2 | 9 | Advanced Machine Learning | Linear Regression | 31 | NA | |
| Book3-Chapter2 | 8 | 3 | 8 | 3 | 8 | Advanced Machine Learning | Linear Regression | 30 | NA | |
| Book1-Chapter3 | 8 | 3 | 10 | 1 | 10 | Advanced Machine Learning | Complex Regression | 30 | NA | Chapter 3 |
| Book2-Chapter3 | 9 | 3 | 9 | 2 | 9 | Advanced Machine Learning | Complex Regression | 31 | NA | |
| Book3-Chapter3 | 10 | 3 | 8 | 3 | 8 | Advanced Machine Learning | Complex Regression | 32 | Highest Chapter 3 score | |
| Book1-Chapter4 | 8 | 3 | 10 | 1 | 10 | Advanced Machine Learning | Applications of Machine learning | 30 | NA | Chapter 4 |
| Book2-Chapter4 | 10 | 3 | 9 | 2 | 9 | Advanced Machine Learning | Applications of Machine learning | 32 | Highest Chapter 4 score | |
| Book3-Chapter4 | 9 | 3 | 8 | 3 | 8 | Advanced Machine Learning | Applications of Machine learning | 31 | NA | |
| Book1-Chapter5 | 8 | 3 | 10 | 1 | 10 | Advanced Machine Learning | Solving Advanced Multivariate | 30 | NA | Chapter 5 |
| Book2-Chapter5 | 9 | 3 | 9 | 2 | 9 | Advanced Machine Learning | Solving Advanced Multivariate | 31 | NA | |
| Book3-Chapter5 | 10 | 3 | 8 | 3 | 8 | Advanced Machine Learning | Solving Advanced Multivariate | 32 | Highest Chapter 5 score | |

FIG. 6

| Book-Chapter | Chapter Score | Highest Chapter Score |
|---|---|---|
| Book1-Chapter1 | 32 | Highest Chapter 1 score |
| Book1-Chapter2 | 32 | Highest Chapter 2 score |
| Book1-Chapter3 | 32 | Highest Chapter 3 score |
| Book2-Chapter4 | 32 | Highest Chapter 4 score |
| Book3-Chapter5 | 32 | Highest Chapter 5 score |

FIG. 7A

| Chapters across books with highest ratings for pictorial representations | Pictorial Representations, Diagram, Flowcharts, Depictions or Illustrations |
|---|---|
| Book1-Chapter1 | 10 |
| Book1-Chapter2 | 10 |
| Book3-Chapter3 | 10 |
| Book2-Chapter4 | 10 |
| Book3-Chapter5 | 10 |

FIG. 7B

| Book-Chapter | Chapter Name | Chapter Score | Highest Chapter Score | |
|---|---|---|---|---|
| Book1-Chapter1 | Statistics | 32 | Highest Chapter 1 score | Contains summary |
| Book1-Chapter2 | Linear Regression | 32 | Highest Chapter 2 score | |
| Book3-Chapter3 | Complex Regression | 32 | Highest Chapter 3 score | |
| Book2-Chapter4 | Applications of Machine Learning | 32 | Highest Chapter 4 score | |
| Book3-Chapter5 | Solving Advanced Multivariate equation | 32 | Highest Chapter 5 score | |

FIG. 7C

| Book-Chapter | Verbose |
|---|---|
| Book3-Chapter1 | 3 |
| Book3-Chapter2 | 3 |
| Book3-Chapter3 | 3 |
| Book3-Chapter4 | 3 |
| Book3-Chapter5 | 3 |

FIG. 7D

METHOD AND APPARATUS FOR CURATION OF CONTENT

BACKGROUND

Embodiments of the disclosure relate generally to electronic content display systems. More specifically, embodiments of the disclosure relate to systems for curation and display of electronic content.

SUMMARY

The wide availability and selection of digital content, combined with the large number of electronic devices available for its playback, allows users great flexibility in where and how they may consume content. This often presents users with the problem of having access to so much content that it can be difficult to review all of it to determine which they may most want to consume. Systems and methods for curation and sorting of electronic content have thus been developed. These systems attempt to help users find content of interest, by sorting content according to estimates of what users may wish to see.

Content curation systems have significant limitations though. Many electronic curation systems sort content according to criteria that do not adequately reflect individual needs and preferences. For example, many electronic curation systems sort and present content according to reviews from other users, who may have completely different standards for judging content and who may be seeking content for completely different purposes. Rating-based curation thus often winds up presenting content that is a poor match for individual users, inadequately tailored to their particular needs and wants. Other common criteria likewise fail to capture the specific needs of many individuals, and thus lead to poor results.

Accordingly, to overcome the problems and limitations of inadequate and inaccurate electronic content curation, systems and methods are described herein for a computer-based process that curates content, such as e-learning content, according to the particular ways people often desire to process content. More specifically, systems and methods of embodiments of the disclosure allow users to select content according to ways in which people learn. For instance, some individuals are graphic learners who learn best from content that presents concepts in pictorial or graphical form. Accordingly, content may be presented according to the number of pictorial representations contained within. Conversely, some individuals learn better from verbal instruction or explanation rather than pictorial content. Content may thus be ordered and presented according to the amount of verbal expression contained therein. Additionally, some individuals may wish to view content they have already viewed or learned, to refresh their memory. Such individuals often seek a quick summary of content. Content may thus be ordered and presented according to whether it contains a shorter summary of its material.

Content may also be ordered according to other criteria besides, or in addition to, those above. These other criteria include the number of positive reviews as well as a lack of negative reviews. When used along with one or more of the above criteria, numbers of positive/negative reviews may help to indicate quality content of interest to a user.

These other criteria also include relevance to a job market. Content that is relevant to a job market may be of greater interest to people seeking employment in that profession. Sorting or curating by relevance to job market may thus produce more relevant results for individuals seeking employment in, or learning about, that job market.

These other criteria also include conciseness, or brevity of content, as some people learn better in short bursts of time and are not willing to sit through long content. Sorting or curating by brevity of content, or content length, may thus produce more relevant results for time-constrained individuals or those for whom longer content is simply not conducive to e-learning or content consumption.

Criteria can also include chapter scores, for content that is broken up into multiple chapters. Especially in e-learning content and textbook-based content, division into separate chapters may occur. Content consumers may wish to view individual chapters that are relevant to their interests. Accordingly, sorting by chapter scores or rankings allows users to access content more specific to their needs. That is, content can be sorted with more granularity, allowing users to find and access only those chapters that are of interest rather than being required to peruse, for example, an entire lecture or book to find only that portion that relates to a particular topic.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which:

FIG. 6 is a table illustrating content scored for ordering according to criteria of embodiments of the disclosure.

DETAILED DESCRIPTION

In one embodiment, the disclosure relates to systems and methods for curation of content, such as e-learning content or online instructional materials, whether audio, video, or some combination of audio and video content, according to particular criteria such as the amount of pictorial representations contained therein, the amount of verbal expression contained therein, and whether the content contains a summary. Other criteria may also be employed. Users may select any one or more of these and other criteria. Content is sorted according to the selected criteria and presented as an ordered list of content that users can select for viewing.

Figure 1:
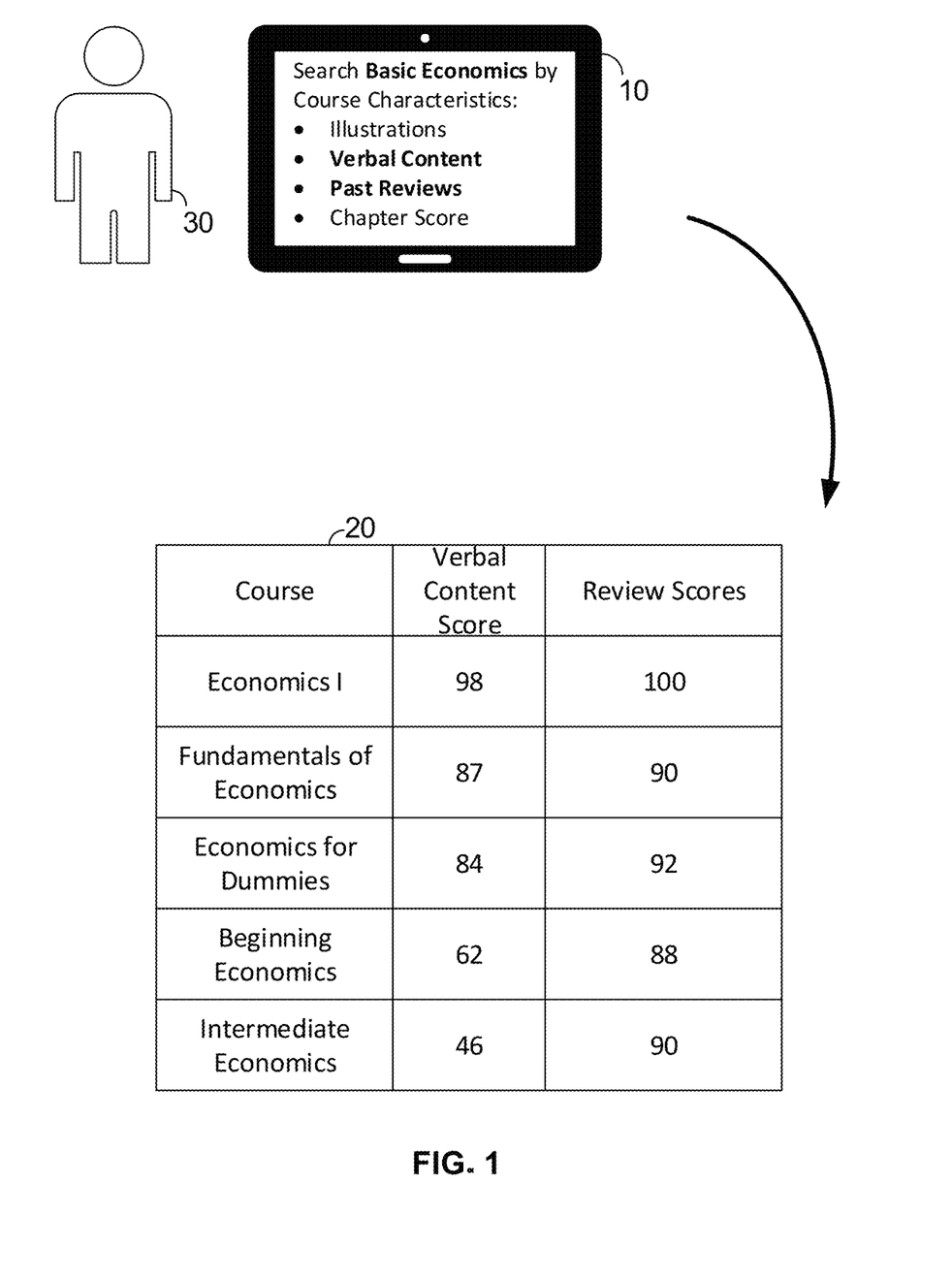
FIG. 1 illustrates an exemplary content curation process performed in accordance with embodiments of the disclosure.

FIG. 1 illustrates an exemplary content curation process performed in accordance with embodiments of the disclosure. Here, a content consumption device 10 displays a user interface from which user 30 can choose subject matter and content characteristics that he or she is interested in. As an example, user 30 can select "Basic Economics" as a subject of interest, as well as "Verbal Content" and "Past Reviews" as criteria of importance to him or her, as shown. Content is then retrieved and sorted according to the selected criteria, and user 30 is presented with an ordered list 20 of content tailored to his or her selected interests. As shown, the list 20 presents basic economics courses ordered according to a combination of the selected priorities of user 30. In particular, as can be seen from FIG. 1, content in list 20 is ordered in descending order of a combination of its verbal content scores and past review scores. Interfaces allowing selection of subject matter and curation criteria, as well as methods for sorting content as shown, are described in further detail below.

Figure 2:
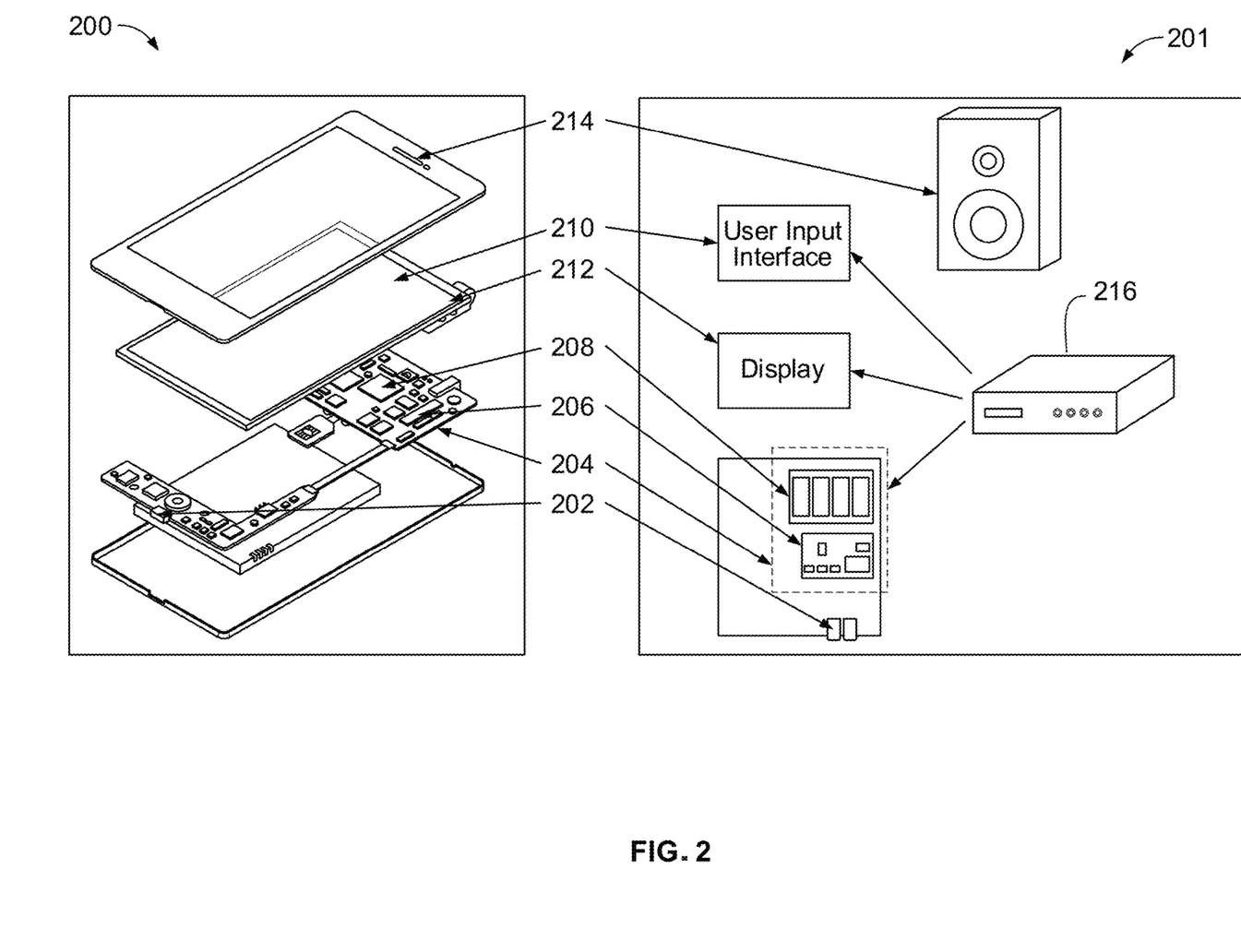
FIG. 2 is a block diagram of an illustrative user equipment device in accordance with embodiments of the disclosure.

FIG. 2 shows generalized embodiments of illustrative user equipment device 200 that may be used in content curation and display according to embodiments of the disclosure. For example, user equipment device 200 may be a smartphone device or a remote control. In another example, user equipment system 201 may be a user television equipment system. User television equipment system 201 may include a set-top box 216. Set-top box 216 may be communicatively connected to speaker 214 and display 212. In some embodiments, display 212 may be a television display or a computer display. In some embodiments, set top box 216 may be communicatively connected to user interface input 210. In some embodiments, user interface input 210 may be a remote-control device. Set-top box 216 may include one or more circuit boards. In some embodiments, the circuit boards may include processing circuitry, control circuitry, and storage (e.g., RAM, ROM, hard disk, removable disk, etc.). In some embodiments, circuit boards may include an input/output path. More specific implementations of user equipment devices are discussed below in connection with FIGS. 3 and 4.

Each one of user equipment device 200 and user equipment system 201 may receive content and data via input/output (hereinafter "I/O") path 202. I/O path 202 may provide content (e.g., broadcast programming, on-demand programming, Internet content, content available over a local area network (LAN) or wide area network (WAN), and/or other content) and data to control circuitry 204, which includes processing circuitry 206 and storage 208. Control circuitry 204 may be used to send and receive commands, requests, and other suitable data using I/O path 202. I/O path 202 may connect control circuitry 204 (and specifically processing circuitry 206) to one or more communications paths (described below). I/O functions may be provided by one or more of these communications paths but are shown as a single path in FIG. 2 to avoid overcomplicating the drawing.

Control circuitry 204 may be based on any suitable processing circuitry such as processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 204 executes instructions for an application program stored in memory (e.g., storage 208). Specifically, control circuitry 204 may be instructed by the application to perform the functions discussed above and below. For example, the application may provide instructions to control circuitry 204 to generate a content curation interface. In some implementations, any action performed by control circuitry 204 may be based on instructions received from the interface.

Memory may be an electronic storage device provided as storage 208 that is part of control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 208 may be used to store various types of content described herein as well as media guidance data described above. Nonvolatile memory may also be used (e.g., to launch a boot-up routine and other instructions). Cloud-based storage, described in relation to FIG. 4, may be used to supplement storage 208 or instead of storage 208.

A user may send instructions to control circuitry 204 using user input interface 210. User input interface 210 may be any suitable user interface, such as a remote control, mouse, trackball, keypad, keyboard, touchscreen, touchpad, stylus input, joystick, voice recognition interface, or other user input interfaces. Display 212 may be provided as a stand-alone device or integrated with other elements of each one of user equipment device 200 and user equipment system 201. For example, display 212 may be a touchscreen or touch-sensitive display. In such circumstances, user input interface 210 may be integrated with or combined with display 212. Display 212 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images.

The content curation application may be implemented using any suitable architecture. For example, it may be a stand-alone application wholly implemented on each one of user equipment device 200 and user equipment system 201. In such an approach, instructions of the application are stored locally (e.g., in storage 208), and data for use by the application is downloaded on a periodic basis (e.g., from an out-of-band feed, from an Internet resource, or using another suitable approach). Control circuitry 204 may retrieve instructions of the application from storage 208 and process the instructions to generate any of the displays discussed herein. Based on the processed instructions, control circuitry 204 may determine what action to perform when input is received from input interface 210. For example, movement of a cursor on a display up/down may be indicated by the processed instructions when input interface 210 indicates that an up/down button was selected.

Figure 3:
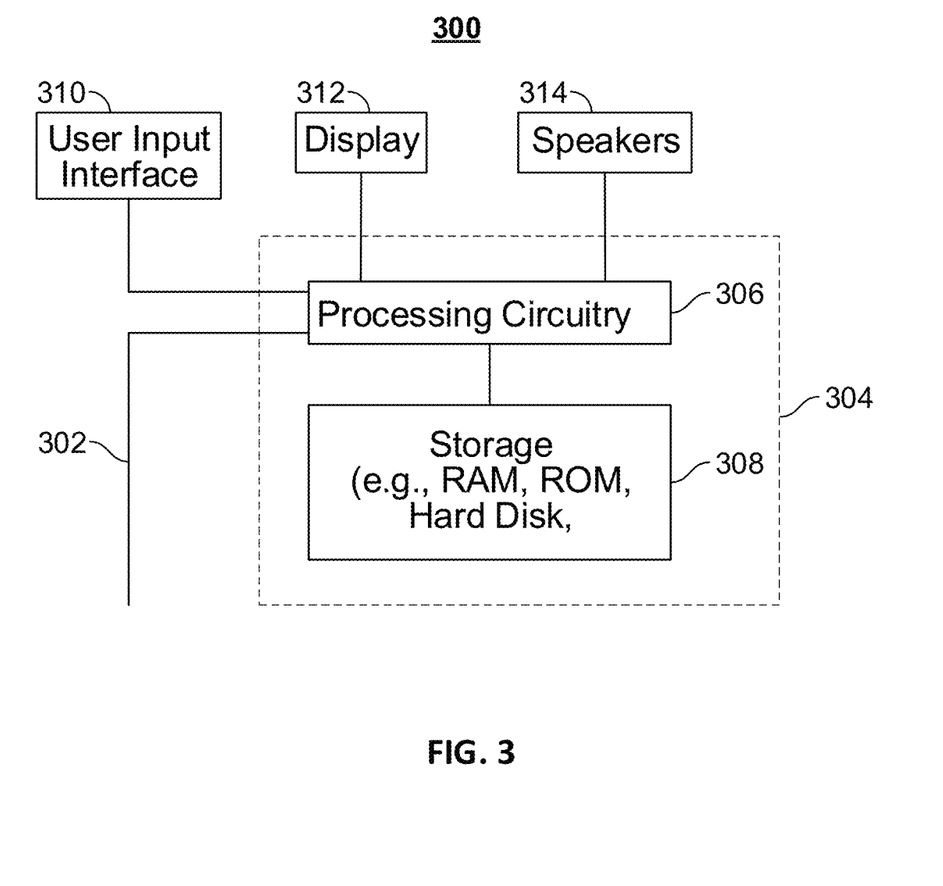
FIG. 3 is a block diagram of an illustrative user equipment device in accordance with some embodiments of the disclosure.

FIG. 3 illustrates user equipment device 200 in block diagram form. In the representation of FIG. 3, device 300, input/output 302, user input interface 310, display 312, speakers 314, control circuitry 304, processing circuitry 306, and storage 308 may correspond to embodiments of user equipment device 200, input/output path of circuit boards of set-top box 216, user interface input 210, display 212, speaker 214, circuit boards of set-top box 216, circuit boards of set-top box 216, and storage on circuit boards of set-top box 216, respectively. As shown in FIG. 3, processing circuitry 306 executes commands retrieved from storage 308, input/output path 302, and/or user input interface 310, and transmits results to display 312, 314, and/or output path 302. Such commands may include commands for sorting or curating content, displaying the sorted list 20 on display 312, and selecting, retrieving and/or playing sorted content from list 20 on display 312 and speaker 314. Commands may also include commands for transmitting curation instructions to other computing devices such as content curator 426 described below, retrieving a sorted list 20 from content curator 426, requesting and retrieving selected content from content curator 426 or content source 416 described below, and playing back retrieved content.

Figure 4:
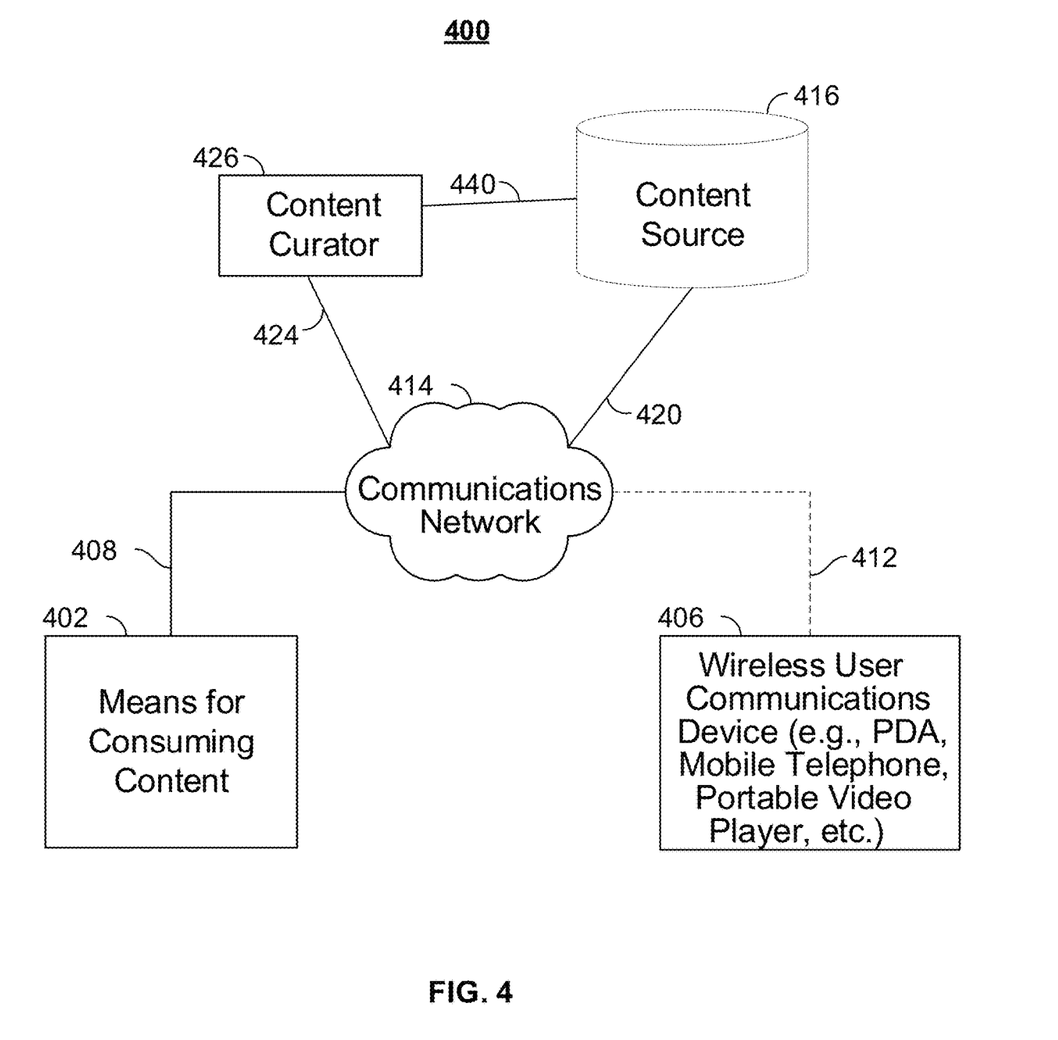
FIG. 4 is a block diagram of an illustrative content curation system in accordance with some embodiments of the disclosure.

Each one of user equipment device 200 and user equipment system 201 of FIG. 2 can be implemented in system 400 of FIG. 4 as means for consuming content 402, system controller 404, wireless user communications device 406, or any other type of user equipment suitable for accessing content, such as a non-portable gaming machine. For simplicity, these devices may be referred to herein collectively as user equipment or user equipment devices and may be substantially similar to user equipment devices described above. User equipment devices, on which a content curation application may be implemented, may function as a stand-alone device or may be part of a network of devices. Various network configurations of devices may be implemented and are discussed in more detail below.

A user equipment device utilizing at least some of the system features described above in connection with FIG. 2 may not be classified solely as means for consuming content 402, system controller 404, or a wireless user communications device 406. For example, means for consuming content 402 may, like some system controller 404, be Internet-enabled allowing for access to Internet content, while system controller 404 may, like some television equipment 402, include a tuner allowing for access to television programming. The content curation application may have the same layout on various different types of user equipment or may be tailored to the display capabilities of the user equipment. For example, on system controller 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

The user equipment devices may be coupled to communications network 414. Namely, means for consuming content 402 and wireless user communications device 406 are coupled to communications network 414 via communications paths 408 and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408 and 412 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and path 408 is drawn as a solid line to it is a wired path (although these paths may be wireless paths, if desired). Communications with the user equipment devices may be provided by one or more of these communications paths but are shown as a single path in FIG. 4 to avoid overcomplicating the drawing.

Although communications paths are not drawn between user equipment devices, these devices may communicate directly with each other via communication paths, such as those described above in connection with paths 408 and 412, as well as other short-range point-to-point communication paths, such as USB cables, IEEE 1394 cables, wireless paths (e.g., Bluetooth, infrared, IEEE 402-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 coupled to communications network 414 via communication path 420. Path 420 may include any of the communication paths described above in connection with paths 408, 410, and 412. Communications with the content source 416 may be exchanged over one or more communications paths but are shown as a single path in FIG. 4 to avoid overcomplicating the drawing. In addition, there may be more than one of each of content source 416, but only one is shown in FIG. 4 to avoid overcomplicating the drawing. (The different types of each of these sources are discussed below.) If desired, content source 416 may be integrated as one source device. Although communications between source 416 and user equipment devices 402, 404, and 406 are shown as occurring through communications network 414, in some embodiments, source 416 may communicate directly with user equipment devices 402, 404, and 406 via communication paths (not shown) such as those described above in connection with paths 408 and 412.

Content curator 426 is coupled to communications network 414 via communication path 424 and coupled to content source 416 via communication path 440. Paths 424 and 440 may include any of the communication paths described above in connection with paths 408 and 412. Content curator 426 may obtain or receive media content from content source 416 via communication path 440.

Content source 416 may include one or more types of content distribution equipment including a television distribution facility, cable system headend, satellite distribution facility, programming sources (e.g., stored content, television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices.

Content and/or data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YouTube, Netflix, and Hulu, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide curation data described above. In addition to content and/or data, providers of OTT content can distribute curation applications (e.g., web-based applications or cloud-based applications), or the content can be displayed by curation applications stored on the user equipment device.

Curation system 400 is intended to illustrate a number of approaches, or network configurations, by which user equipment devices and sources of content and curation may communicate with each other for the purpose of accessing content and providing curation services. The embodiments described herein may be applied in any one or a subset of these approaches, or in a system employing other approaches for delivering content and providing media guidance.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 2.

Figure 5A:
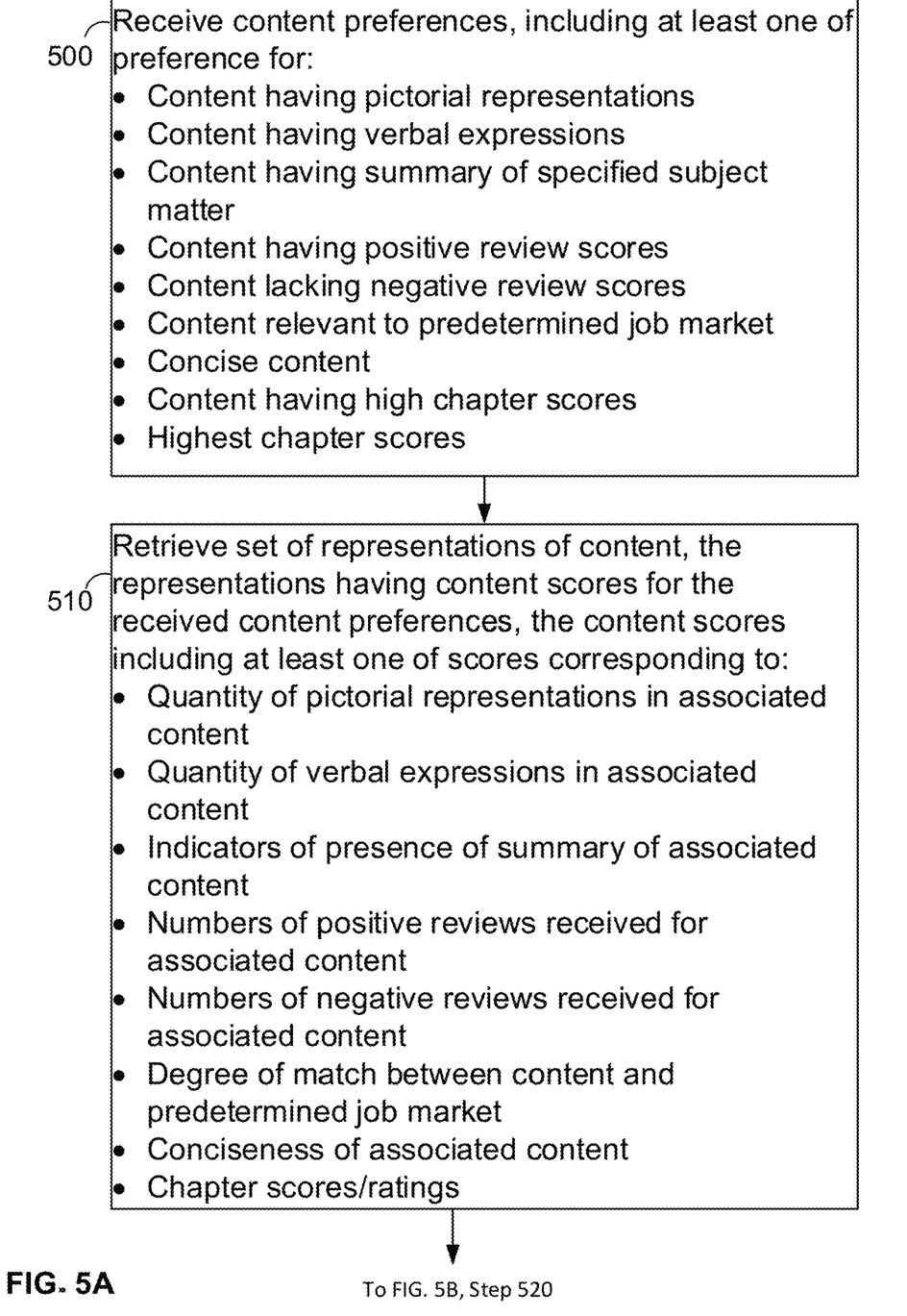
FIGS. 5A and 5B are a flowchart illustrating process steps for content curation according to embodiments of the disclosure.
Figure 5B:
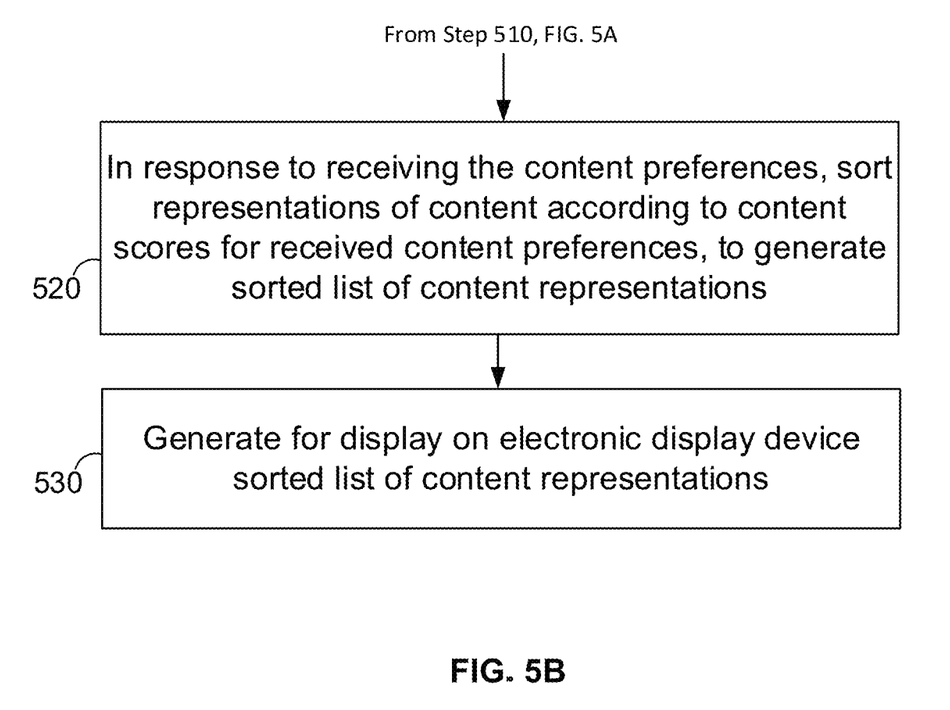

FIGS. 5A and 5B are a flowchart illustrating process steps for content curation according to embodiments of the disclosure. Initially, user equipment device 200 receives a subject matter preference through an above-described curation interface presented on its display 212. It then presents a request for content preferences. The user equipment device 200 receives content preferences input by user 30 (Step 500), where these preferences include at least one of a preference for 1) content having a high number or relative amount of pictorial representations (e.g., graphs, diagrams, flowcharts, illustrations, depictions, and any other visual representations of concepts or ideas), 2) content having a high number or relative amount of verbal expressions (e.g., verbal explanations of concepts or ideas), 3) content containing a summary of the specified subject matter, 4) content having positive review scores, 5) content lacking or having few negative review scores, 6) content relevant to a specified job market, 7) concise content, 8) content having high corresponding chapter scores, and 9) highest chapter scores. A user 30 may select any one or more of these preferences. When selecting preference 6), users 30 may also be allowed to enter or select the specific job market they are interested in.

The user equipment device 200 then retrieves a set of representations of content from content curator 426 (Step 510). Representations can be any indicator of the corresponding content, such as the content title, a pointer to the content as stored in content source 416, or the like, and are simply any description of corresponding content available to user 30. The user equipment device 200 also retrieves, for each content representation, corresponding scores for at least every criterion selected in Step 500. Scores are numerical values for each category 1) through 9) above, and can be scores according to any scale, e.g., 1-100. In particular, for each content having a retrieved content representation, there may also be retrieved one score for each of the following: 1) quantity of pictorial representations in associated content, 2) quantity of verbal expressions in associated content, 3) indication of presence of summary of associated content (e.g., summary present, or summary not present; numerical score indicating quality of summary, with 0=no summary present, etc.), 4) indication of number of positive reviews received for associated content, 5) indication of presence or number of negative reviews received for associated content, 6) indicator of degree of match between content and predetermined job market, 7) indicator of conciseness of associated content, and 8) chapter score or indication of chapter ratings. The retrieved scores are used in ordering or curating content.

In response to receiving the content preferences, user equipment device 200 then sorts its content representations according to the corresponding received scores, thus generating a sorted list of content representations (Step 520). Ordering can be performed in any manner, and embodiments of the disclosure encompass any form of ordering and curation. As one example, content of a given subject can be ordered according to highest combined score of each category, i.e., highest sum or product of scores of the selected criteria, with ties arranged in alphabetical order of content title. As another example, users 30 may be allowed to select a hierarchy of criteria, with content ordered according to score order of the most important criterion, then in score order of the next most important criterion, etc. As a further example, content can be arranged in score order of the first criterion selected, then in score order of the second criterion selected, etc. Once the content representations are ordered, the ordered or sorted list is generated for display on display 212 (Step 530).

In the process of FIGS. 5A-5B as described above, user equipment device 200 performs sorting of content. However, it is noted that embodiments of the disclosure contemplate sorting on any other device. For example, sorting may instead be performed by a cloud-based service or remote device such as content curator 426. In this case, user equipment device 200 transmits its received preferences or content selection criteria to content curator 426 through communications network 414. The content curator 426 has stored in its memory, or retrieves from content source 416, representations of content stored in content source 416 as well as corresponding scores for each of the above criteria. The content curator 426 then orders the content representations according to their associated scores and the selected criteria of Step 500. Content, or content representations, may be ordered in any manner, as above. Once the content curator 426 orders content, it may transmit the ordered list of content (e.g., content representations, their order, and scores) to user equipment device 200, which displays the ordered list for the user 30.

FIGS. 6 and 7A-7D are tables illustrating exemplary curation processes in accordance with embodiments of the disclosure. FIG. 6 is a table illustrating content and its associated criteria and scores according to embodiments of the disclosure. In particular, different content is listed in each horizontal line, with its corresponding scores for each criterion. This content, its associated representations, and scores can be stored in a database or other memory, such as content source 416. However, it is noted that content, representations, and scores can be stored in any location and in any manner, such as in content curator 426 or locally on user equipment device 200.

Figure 7A:
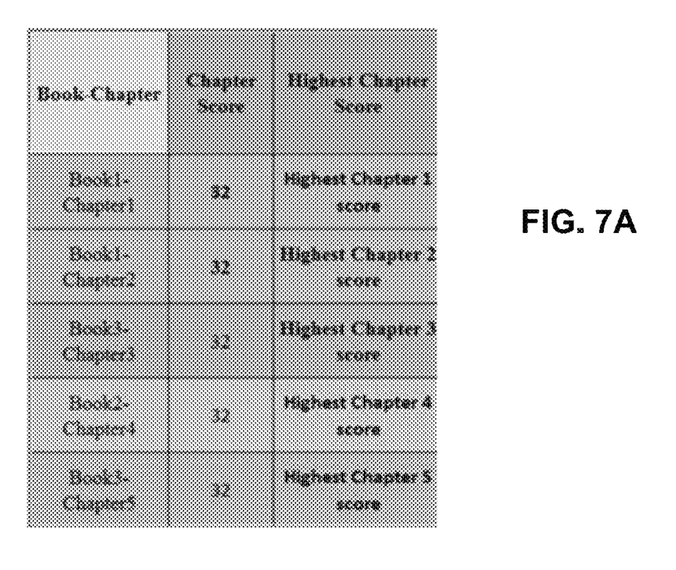
FIGS. 7A-7D are tables illustrating content curated according to embodiments of the disclosure.

FIG. 7A illustrates sorting according to chapter score and highest chapter score, such as when user 30 has selected criteria 8) and 9) above. Chapter scores are assigned a numerical value such as 1-32, and highest chapter scores are chapters on a particular subject which have received a highest score of all chapters on that subject. Content is thus sorted by chapter score, and then by for example magnitude of highest chapter score, in order of chapter number.

Figure 7B:
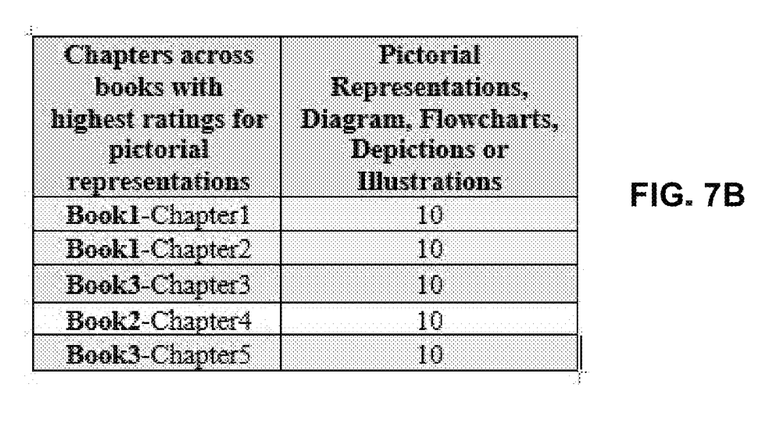

FIG. 7B illustrates sorting according to number of pictorial representations, such as when user 30 has selected criterion 1) above for a particular subject. Content is thus sorted by pictorial representation score, in this case 1-10, and then for example alphabetically by content title. Accordingly, device 200 would first display an alphabetically ordered list of content for the specified subject, that received the maximum pictorial representation score.

Figure 7C:
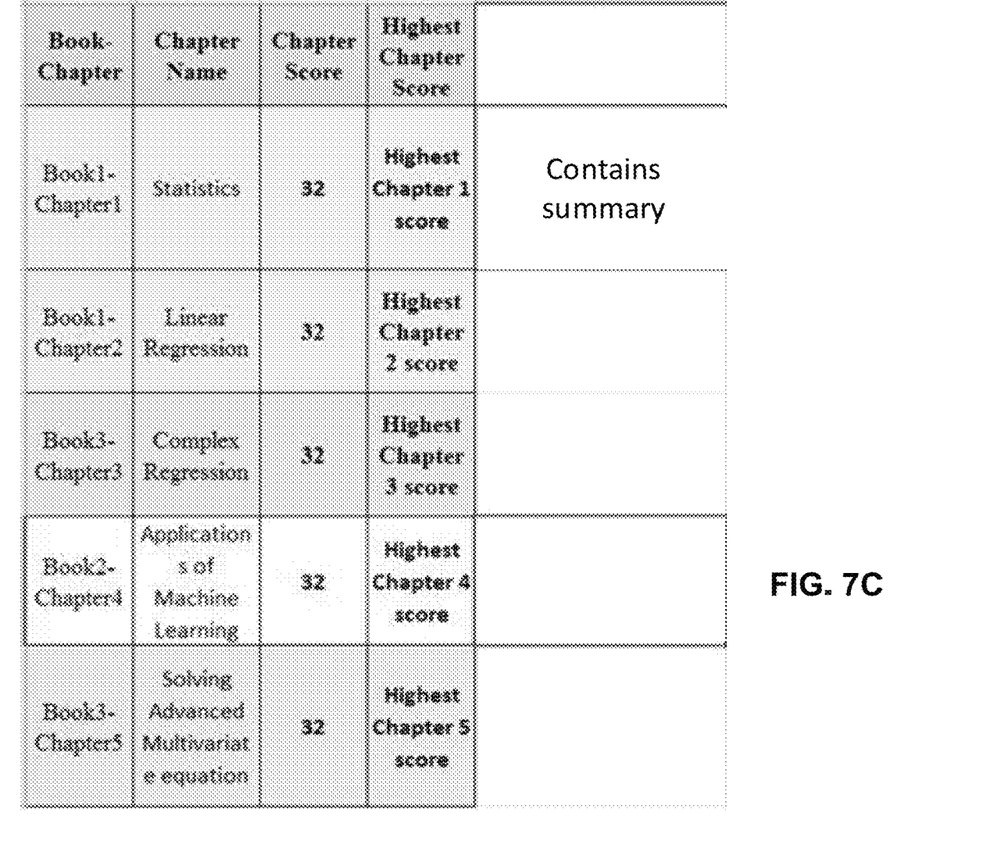

FIG. 7C illustrates sorting according to chapter score, highest chapter score, and summary of content. Sorting is thus performed as with the example of FIG. 7A, but with the added criterion of a content summary selected. In this example, user 30 selected Statistics as his or her subject matter, then selected the chapter score, highest chapter score, and content summary preferences. The entry with maximum chapter score, highest chapter score, and a summary is thus ranked first, while subsequent entries have maximum chapter scores and highest chapter scores as well but lack a summary.

Figure 7D:
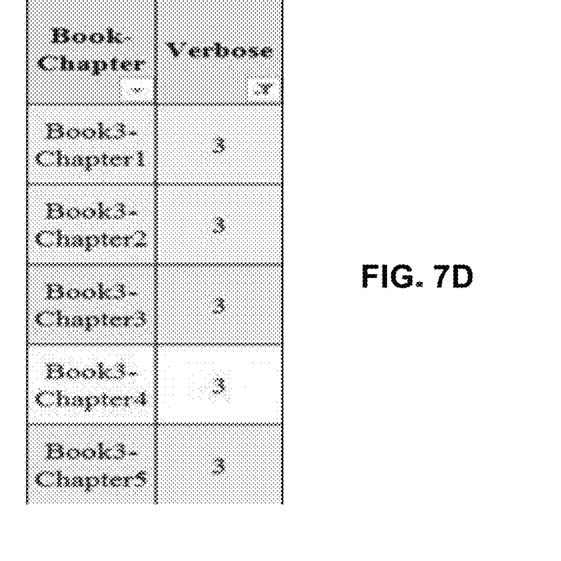

FIG. 7D illustrates sorting according to verbosity. User 30 selects quantity of verbal expressions as his or her criterion, and content is thus sorted accordingly. Here, results are presented as a list of content of a particular selected subject, ordered in descending order of verbosity score and then for example alphabetically. The top of the list, as shown in FIG. 7D, is thus an alphabetical list of content titles having maximum verbosity scores.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, any type of content may be selected and sorted according to any one or more of the criteria disclosed. Sorting may be performed according to the selected criteria, in any manner. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method of presenting personalized content, the method comprising:
   receiving, at a user device via a user interface, input comprising a selection of content preferences including a first preference for content having pictorial representations, a second preference for content having verbal expressions, and a third preference for content having a summary of specified subject matter;
   transmitting from the user device and to a content curator, the received selection of content preferences;
   retrieving from a memory of the content curator, a set of representations of content, each representation corresponding to a single content preference of the selection of content preferences and having a content score for the single content preference, wherein each content score is constant and a first score corresponds to a quantity of the pictorial representations in the associated content, a second score corresponds to a quantity of the verbal expressions in the associated content, and a third score corresponds to indicators of a presence of the summary in the associated content;
   in response to receiving the selection of content preferences, sorting at the content curator the representations of content according to the content scores for the single content preferences of the selection of content preferences, generating a sorted list of the content representations;
   transmitting from the content curator to the user device the sorted list of content representation; and
   generating for display on a display associated with the user device the sorted list of the content representations.

2. The method of claim 1, wherein:
   the selection of content preferences further includes a fourth preference for content having positive review scores; and
   the content score includes one of the first score, the second score, the third score or fourth score corresponding to numbers of positive reviews received for the associated content.

3. The method of claim 1, wherein:
   the selection of content preferences further includes a fourth preference for content lacking negative review scores; and the content score includes one of the first score, the second score, the third score or fourth score corresponding to numbers of negative reviews received for the associated content.

4. The method of claim 1, wherein:
the selection of content preferences further includes a fourth preference for content relevant to a predetermined job market; and
the content score includes one of the first score, the second score, the third score or fourth score corresponding to a degree of match between the content and the predetermined job market.

5. The method of claim 1, wherein:
the selection of content preferences further includes a fourth preference for concise content; and
the content score includes one of the first score, the second score, the third score or fourth score corresponding to a conciseness of the associated content.

6. The method of claim 1, wherein the content comprises audio content.

7. The method of claim 1, wherein the content comprises video content.

8. The method of claim 7, wherein the video content comprises online learning content.

9. The method of claim 8, wherein:
the online learning content comprises a plurality of chapters;
the selection of content preferences further includes a fourth preference for content having high chapter scores; and
the content score includes one of the first score, the second score, the third score or fourth score that are the chapter scores, wherein the chapter scores are ratings of the chapters.

10. The method of claim 9, wherein the selection of content preferences further includes a fifth preference for a highest one of the chapter scores.

11. A system for presenting personalized content, the system comprising:
a storage device; and
control circuitry configured to:
receive, at a user device from a user interface, input comprising a selection of content preferences including a first preference for content having pictorial representations, a second preference for content having verbal expressions, and a third preference for content having a summary of specified subject matter;
transmit from the user device and to a content curator, the received selection of content preferences;
retrieve from a memory of the content curator, a set of representations of content, each representation corresponding to a single content preference of the selection of content preferences and having a content score for the single content preference, wherein each content score is constant and a first score corresponds to a quantity of the pictorial representations in the associated content, a second score corresponds to a quantity of the verbal expressions in the associated content, and a third score corresponds to indicators of a presence of the summary in the associated content;
in response to receiving the selection of content preferences, sorting at the content curator the representations of content according to the content scores for the single content preferences of the selection of content preferences, to generate a sorted list of the content representations;
transmit from the content curator to the user device the sorted list of content representation; and
generate for display on a display associated with the user device the sorted list of the content representations.

12. The system of claim 11, wherein:
the selection of content preferences further includes a fourth preference for content having positive review scores; and
the content score includes one of the first score, the second score, the third score or fourth score corresponding to numbers of positive reviews received for the associated content.

13. The system of claim 11, wherein:
the selection of content preferences further includes a fourth preference for content lacking negative review scores; and
the content score includes one of the first score, the second score, the third score or fourth score corresponding to numbers of negative reviews received for the associated content.

14. The system of claim 11, wherein:
the selection of content preferences further includes a fourth preference for content relevant to a predetermined job market; and
the content score includes one of the first score, the second score, the third score or fourth score corresponding to a degree of match between the content and the predetermined job market.

15. The system of claim 11, wherein:
the selection of content preferences further includes a fourth preference for concise content; and
the content score includes one of the first score, the second score, the third score or fourth score corresponding to a conciseness of the associated content.

16. The system of claim 11, wherein the content comprises audio content.

17. The system of claim 11, wherein the content comprises video content.

18. The system of claim 17, wherein the video content comprises online learning content.

19. The system of claim 18, wherein:
the online learning content comprises a plurality of chapters;
the selection of content preferences further includes a fourth preference for content having high chapter scores; and
the content score includes one of the first score, the second score, the third score or fourth score that are the chapter scores, wherein the chapter scores are ratings of the chapters.

20. The system of claim 19, wherein the selection of content preferences further includes a fifth preference for a highest one of the chapter scores.

* * * * *